United States Patent [19]
Rigo

[11] Patent Number: 5,820,143
[45] Date of Patent: Oct. 13, 1998

[54] RECYCLER TROLLEY

[76] Inventor: Alex Z. Rigo, 593 Hillside Ave., Pembroke, Ontario, Canada, K8A 8G4

[21] Appl. No.: 853,901

[22] Filed: May 9, 1997

[51] Int. Cl.⁶ ........................................ B62B 1/22
[52] U.S. Cl. .................................... 280/47.19; 280/47.26; 83/468.7
[58] Field of Search ............................. 280/47.24, 47.26, 280/47.33, 47.35, 47.19, 652, 79.3; 33/32.3, 41.1, 41.6, 628, 630, 640; 83/614, 467.1, 468.7, 821

[56] References Cited

U.S. PATENT DOCUMENTS

| | | | |
|---|---|---|---|
| 1,149,639 | 8/1915 | Doust | 280/47.19 |
| 1,480,168 | 1/1924 | Lambert | 83/455 |
| 2,104,323 | 8/1938 | Hirschberg | 255/51 |
| 2,798,651 | 7/1957 | Wasyluk | 224/42.46 |
| 2,986,401 | 5/1961 | Altadonna | 280/36 |
| 3,240,507 | 3/1966 | Braun | 280/47.35 |
| 3,358,540 | 12/1967 | Hall | 83/455 |
| 3,472,392 | 10/1969 | Hahn | 211/126 |
| 3,779,119 | 12/1973 | Broides | 83/581 |
| 3,874,531 | 4/1975 | Mayo | 214/130 |
| 3,903,789 | 9/1975 | Hurley | 100/34 |
| 4,302,024 | 11/1981 | Weddle | 280/47.33 |
| 5,108,120 | 4/1992 | Jarmusz et al. | 280/47.2 |
| 5,135,245 | 8/1992 | Pagine et al. | 280/79.2 |
| 5,244,220 | 9/1993 | Cortez | 280/47.26 |
| 5,464,237 | 11/1995 | Saporiti | 280/30 |

Primary Examiner—Brian L. Johnson
Assistant Examiner—Michael Cuff
Attorney, Agent, or Firm—Sughrue, Mion, Zinn, Macpeak & Seas, PLLC

[57] ABSTRACT

A recycler trolley has a series of compartments that are serially arranged for housing bins for recyclable items. The compartments are of two types: first compartments having a shelf, and second compartments without any shelf. Each first compartment has an upper compartment above the respective shelf and a lower compartment below the shelf. Bins of a first size fit into each second compartment, and bins of a reduced second size fit into each upper compartment. Each lower compartment is adapted to hold newspapers, cardboard, or similar recyclable flat objects. A string dispenser is positioned above each lower compartment for extending string down-wardly across the entrance of the respective lower compartment. String is automatically dispensed to surround the aggregate of the flat objects in a lower compartment, and such string is tied when the compartment is full so as to facilitate removal of the flat objects.

15 Claims, 6 Drawing Sheets

RECYCLER TROLLEY

FIELD OF THE INVENTION

The invention relates to a recycler trolley, and more particularly to a recycler trolley having compartments with string dispensing means for tying together recyclable flat paper material such as newspapers and cardboard prior to their removal from the trolley.

BACKGROUND OF THE INVENTION

Recycling of materials is becoming increasingly important for environmental reasons and in some cases for lowering production costs. It is now common to see, outside of business establishments and residences, containers for collecting recyclable materials such as newspapers, aluminum cans, clear and coloured glass, and other materials. Some of these containers are mounted on wheels so that, after being filled, they may more easily be moved to curbside for collection of the recyclables in trucks. For instance, U.S. Pat. No. 5,108,120 discloses a mobile recycling cart having a plurality of vertically-stacked, selectively-removable shelves on which are selectively stored a number of waste materials baskets. The baskets may be removed from the cart and distributed to locations around the home or office; after being filled with particular recyclables, the baskets may be placed back onto the cart which can be then wheeled to curbside for collection of the recyclables. U.S. Pat. No. 5,135,245 discloses a recycling cart and container system in which the containers have arcuately-shaped bottoms that are specially configured to fit into a cart base having a pair of parallel support rods. A bar extends parallel to the rods along the centreline of the cart, and a rear wall of each container has side hooks for connecting to the bar to maintain the container upright.

The present invention is a recycling trolley which facilitates collection of recyclable paper products, such as newspapers and cardboard. The trolley provides a means for bundling paper products to simplify their collection, and also provides some protection to the paper products against adverse outdoor weather conditions. The trolley is simultaneously able to carry several standard sizes of recycling bins for holding materials such as metals, plastics, and clear and/or coloured glass. It might also have a hybrid use, being used partially for carrying bins for recyclables and partially for carrying garbage containers.

SUMMARY OF THE INVENTION

In its broadest form, the invention is a recycler trolley having a base member supported for manual movement on a mobility means, an upper frame mounted on the base member, and at least one string dispensing means for tying flat objects in a compartment defined on the upper frame. The upper frame defines at least one first compartment and at least one second compartment. Each first compartment has the same height as each second compartment, and each of the first and second compartments has a width approximating the width of the base member. The aggregate length of the at least one first compartment and the at least one second compartment approximates the length of the base member. Each first compartment is divided into an upper compartment and a lower compartment by a respective shelf means. Each of the first compartments has a string dispensing means which is mounted partially on the respective shelf means and partially on the base member such that string is initially extended vertically across an entrance of the lower compartment of the respective first compartment on one side of the trolley. The placement of an initial flat object into a lower compartment through the respective entrance of that lower compartment causes a forward edge of that object to draw string out of the respective dispensing means. The string then extends across the top and under the bottom of the initial flat object. The placement of further flat objects into the lower compartment causes additional string to be drawn from the respective dispensing means such that the string extends across the top of the last flat object placed into the compartment while remaining under the bottom of the initial flat object. The string thereby extends around all flat objects in the lower compartment, and allows those objects to be bound into a single package for facilitating their removal from that compartment.

The string dispenser means may comprise a container for holding string and a string attachment member, the container being mounted on the respective shelf means and the string attachment member being mounted on the base member at a point below the respective shelf means. The mobility means may comprise a pair of wheels and a pair of legs. Each of the wheels is positioned opposite to the other on a respective longer side of the base member, and the pair of wheels are positioned on the base member so as to be slightly closer to a first end of the trolley. Each of the legs is positioned at a respective one of a pair of corners of the base member at a second end of the trolley. The outer end of each of the legs is pointed for piercing a ground surface, for maintaining the trolley in one position. For movement of the trolley, a person raises the second end of the trolley so that the outer end of each of the legs is above the surface, and then balances the trolley while moving it on the pair of wheels. The trolley may have a handle member attached to the upper frame at the second end of the trolley.

The base member may comprise an outer frame, a lower support member, and a mesh floor member having planar integrity. The lower support member extends from one side to the other side of the trolley, and is supported at either end by a respective wheel of the pair of wheels. The mesh floor member is supported by the outer frame and the lower support member, and allows water to drain therethrough.

The ends of the trolley as well as that portion of the other side of the trolley that is behind each first compartment may be enclosed, a wall may extend between each adjacent pair of compartments, and each shelf means may be a solid shelf member through which water cannot pass. The edge of each shelf member on the one side of the trolley extend at a sloping downward angle so as to channel water on the shelf member away from the respective lower compartment.

A portion of the upper frame may be formed by upper support members each extending across a top face of the trolley. Respective upper support members extend from one side to the other side of the trolley at each end of the trolley and between pairs of adjacent compartments. A gauge member is removably mounted to the top of the trolley for aligning one end of one or more pieces of cardboard to facilitate cutting of the other end of the cardboard by a cutting means adapted to be extended within a cutting guide that is adjacent to a particular upper support member. The cardboard is cut by this arrangement in order to uniformly fit within one of the lower compartments. The gauge member may be a U-channel member or a Z-bar member which is adjustably secured to the top of the trolley so as to define a mouth that faces toward the particular upper support member. The one end of the one or more pieces of cardboard may be fitted into the mouth defined by the U-channel member or Z-bar member. The cutting guide is a U-shaped stainless steel member. The particular upper support member may be a support member extending across one of the ends of the trolley.

Each second compartment may be adapted to house a recycling bin having one of a first group of standard sizes, and each upper compartment may be adapted to house a recycling bin having one of a second group of standard sizes. The bins in the second group of standard sizes all have less depth than the bins in the first group of standard sizes.

In one form, the trolley may have two first compartments and one second compartment, the second compartment being positioned intermediate of the two first compartments. In another form, the trolley may have only one first compartment and one second compartment. In a further form, the trolley may have two first compartments and two second compartments, the two second compartments being positioned intermediate of the two first compartments.

DESCRIPTION OF THE DRAWINGS

The invention will next be more fully described by means of preferred embodiments utilizing the accompanying drawings, in which.

DETAILED DESCRIPTION OF PREFERRED EMBODIMENTS

Figure 1:
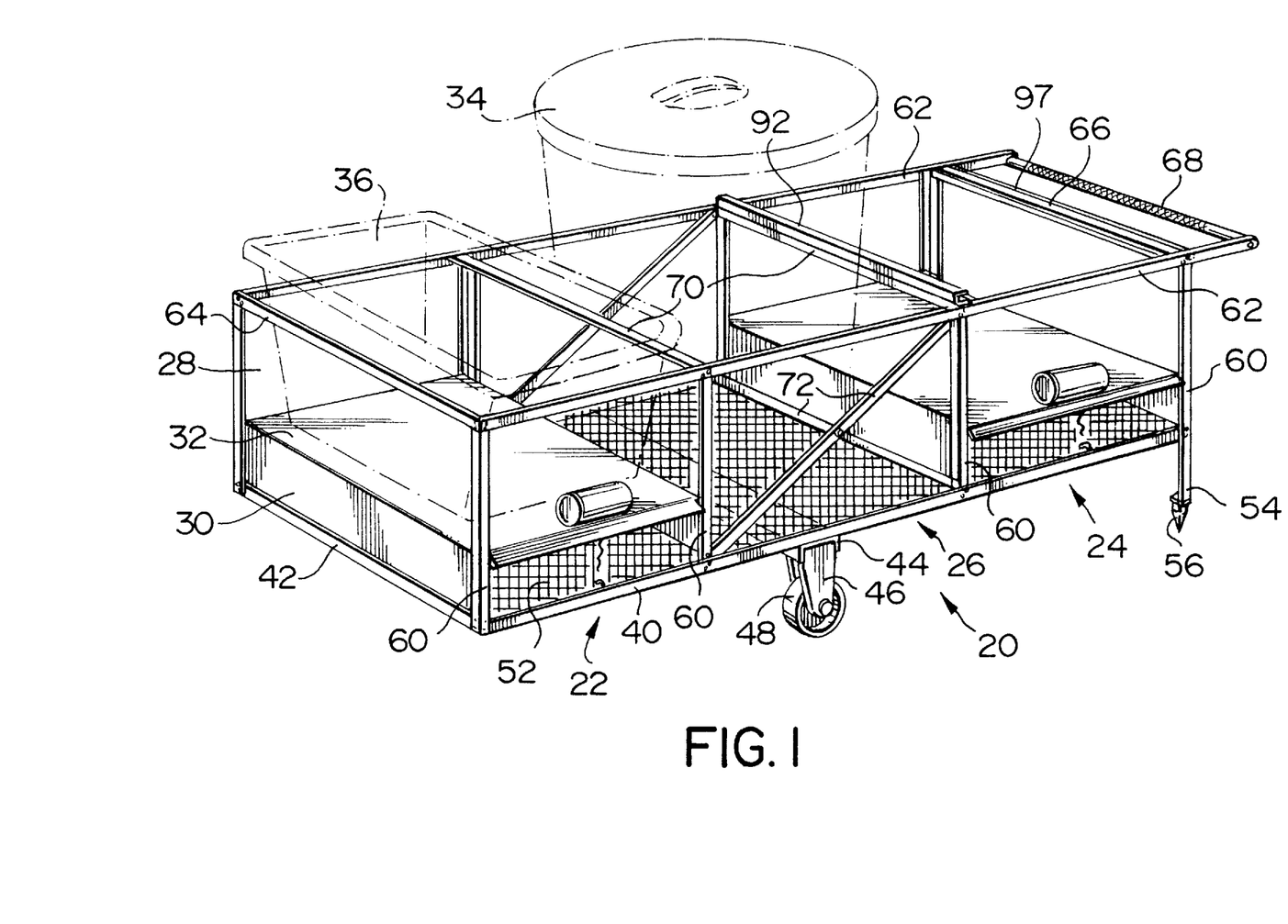
FIG. 1 is a perspective view of a first embodiment of the recycler trolley of the invention, the trolley having two first compartments and one second compartment.

The first embodiment of the recycler trolley, which is generally designated 20 in FIG. 1, has three compartments. The two end compartments, generally designated 22 and 24, are of similar construction; each extends on a respective opposite side of a centre compartment 26. The end compartment 22 is divided between an upper compartment 28 and a lower compartment 30 by a shelf 32. A garbage container 34 is shown in outline positioned in the centre compartment 26, and a recyclables bin 36 is shown in outline positioned in the upper compartment 28.

Figure 2:
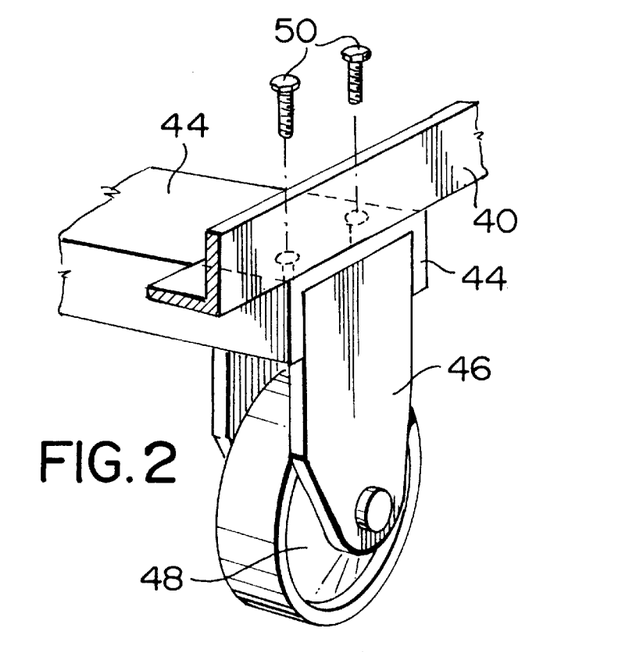
FIG. 2 is a perspective view of one of the wheels on the recycler trolley and its connection to the base member.
Figure 3:
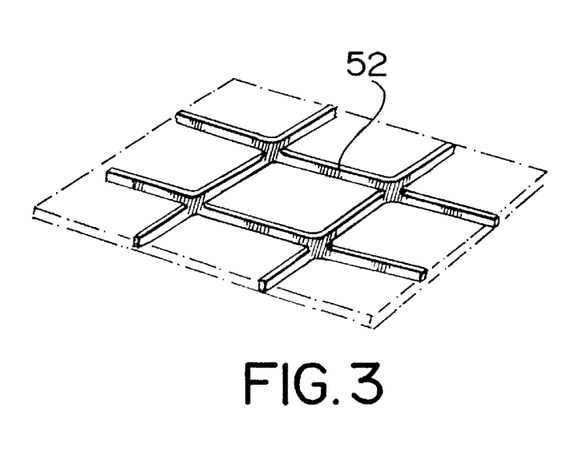
FIG. 3 is a perspective view of a mesh floor member used in the base of the recycler trolley.

The base and the upper frame of trolley 20 are constructed from lengths of angle-iron which are bolted to each other. The base is formed from two 68-inch lengths of angle-iron forming the base side members 40 and two 24-inch lengths of angle-iron forming the base end members 42. As shown in FIGS. 1 and 2, each end of a 24-inch U-shaped cross bar 44 extends under a respective base side member 40 at a point slightly off-centre from the mid-points of each base side member 40, closer to a first end of trolley 20. As shown in FIG. 2, secured to each end of bar 44 is a U-shaped wheel strut 46 between the ends of which a wheel 48 is rotatably mounted. Each respective base side member 40, respective end of bar 44, and respective wheel strut 46 are held together by a pair of bolts 50. Positioned on the internal shelf formed by the inward-facing horizontal angle-iron segments of the base side members 40 and the base end members 42 is a floor member 52 of metal mesh. As shown in FIG. 3, the floor member 52 is structured so as to retain planar integrity when loaded with weight.

Figure 4:
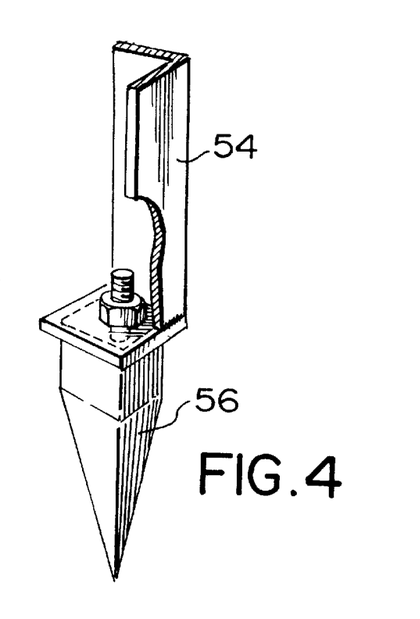
FIG. 4 is a perspective view of one of the legs on the recycler trolley.

Extending vertically at a second end of trolley 20, at the points where the ends of the base end member 42 intersect with the respective end of the base side members 40, are a pair of 30-inch angle-iron leg struts 54. To the bottom end of each leg strut 54 is bolted a pointed member 56 having a pyramidal shape, as shown in FIG. 4. The utility of the pointed members 56 will subsequently be further described.

In the three-compartment recycler trolley of the first embodiment, as shown in FIG. 1, an upper frame is constructed from six 24-inch angle-iron side support members 60, extending vertically from the trolley base, and by an upper 24-inch section of each of the leg struts 54. Two of the side support members 60 extend from the corners of the base at a first end of trolley 20, and the other four side support members extend from the base at 2-foot intervals along the base side members 40. The upper ends of the leg struts 54 and the side support members 60 are connected to positions on a pair of 72-inch top side members 62, one end of which are connected at the first end of trolley 20 to respective opposite ends of a first top end member 64. The other end of the top side members 62 extend past the upper end of the leg struts 54—which are connected by a second top end member 66— and terminate with a connection to a respective opposite end of a handle member 68. A pair of upper support members 70 extend between the top side members 62 at positions adjacent the connection points of the inner pairs of side support members 60 with the top side members 62, as shown in FIG. 1. A pair of cross-braces 72 connect the ends of each inner pair of side support members 60 for adding stability to the frame of trolley 20. The top side members 62, the first top end member 64, and the second top end member 66 are all formed from angle-iron. The pair of cross-braces 72 are each formed from flat steel bar that is ³⁄₂-inches wide and ⅛-inch thick. Although not fully shown for clarity in FIG. 1, the back side of the two end compartments 22 and 24, as well as both ends of the trolley 20, is enclosed; a wall also separates each of the end compartments 22 and 24 from the centre compartment 26.

Figure 5:
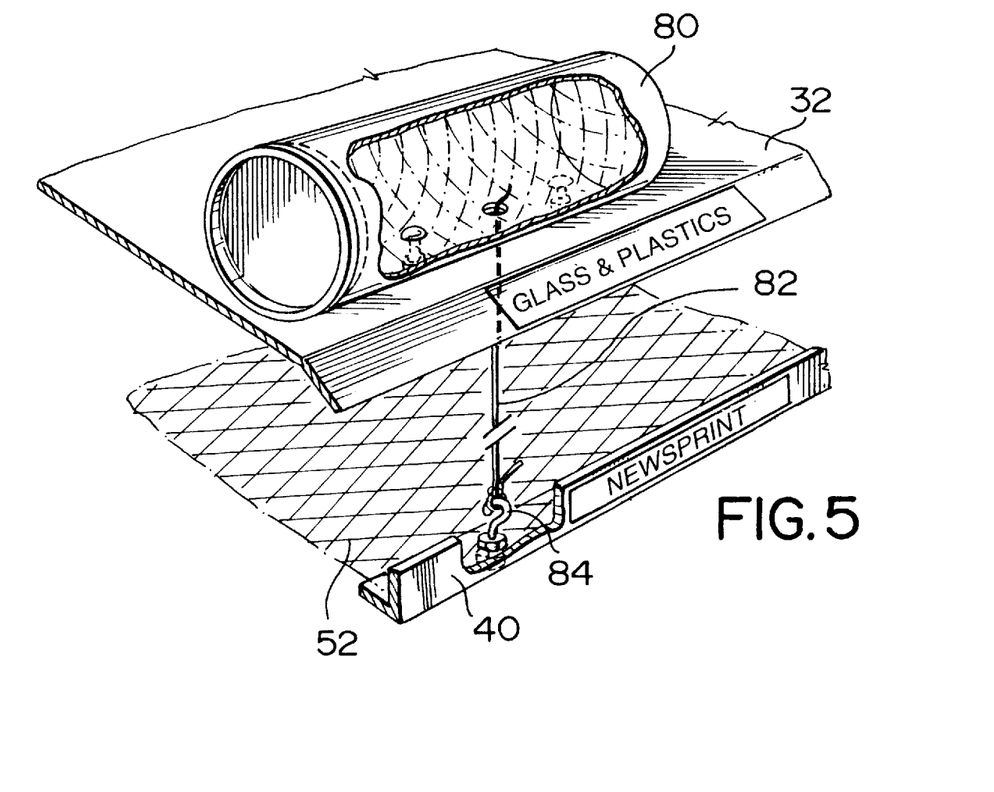
FIG. 5 is a partially-sectioned perspective view of an entrance to a lower compartment, the view showing a container housing a spool of string, the string extending through a hole in the container and the shelf and connecting to a hook on the base of the trolley.

FIG. 5 illustrates a mechanism that assists with tying together flat paper products, such as newspapers or cardboard pieces, as they are collected on the recycling trolley 20. The mechanism includes a refillable cylindrical string dispenser 80 that is bolted to the shelf 32; within the dispenser 80 is a string spool 81. A length of string 82 from string spool 81 extends through a hole in the bottom of the dispenser 80, then through a hole in the shelf 32, then downwardly across the entrance of the respective lower compartment. The end of string 82 is tied to a hook member 84 bolted to that base side member 40 which extends under the entrance to the respective lower compartment. FIG. 5 illustrates the sloping downward angle that is present on a front side of the shelf 32, which is of solid construction; that slope causes rain or other water to be deflected away from any recyclable paper products sitting on the mesh floor member 52 in the respective lower compartment 30, and thus helps to protect those products from bad weather when the trolley 20 is sitting outside.

Figures 6, 6A, 6B:
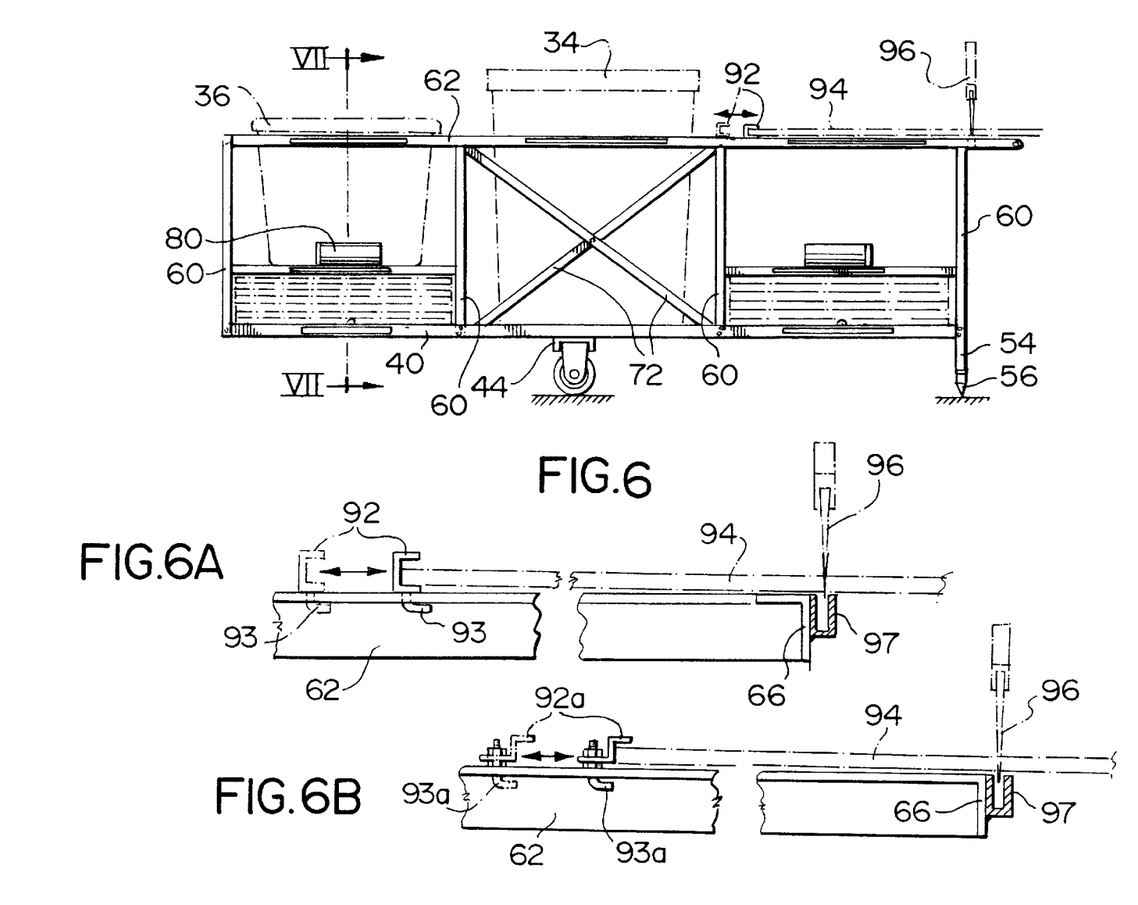
FIG. 6 is a side view of the first embodiment of the recycler trolley, the two lower compartments being shown filled with recyclable newspapers on the left and cardboard products on the right.
FIG. 6A is an enlargement of a first embodiment of a cardboard cutting mechanism that is shown in the upper right portion of FIG. 6.
FIG. 6B is an enlargement of a second embodiment of a cardboard cutting mechanism that is shown in the upper right portion of FIG. 6.
Figure 7A:
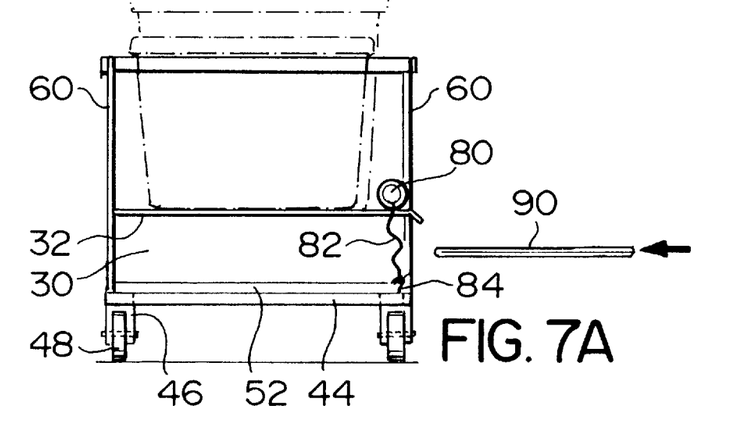
FIG. 7A is a cross-section view through the line VII—VII of FIG. 6, the view showing an initial newspaper or piece of cardboard being placed into the left lower compartment of the trolley.
Figure 7B:
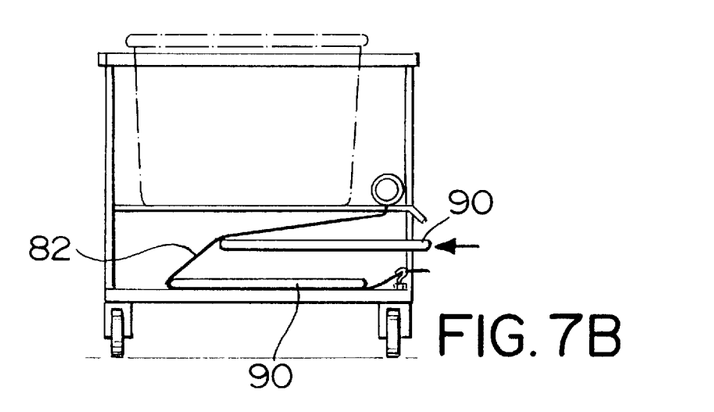
FIG. 7B is a left end view similar to FIG. 7A, but showing the initial newspaper or piece of cardboard in place in the lower compartment and a respective second newspaper or piece of cardboard being added.
Figure 7C:
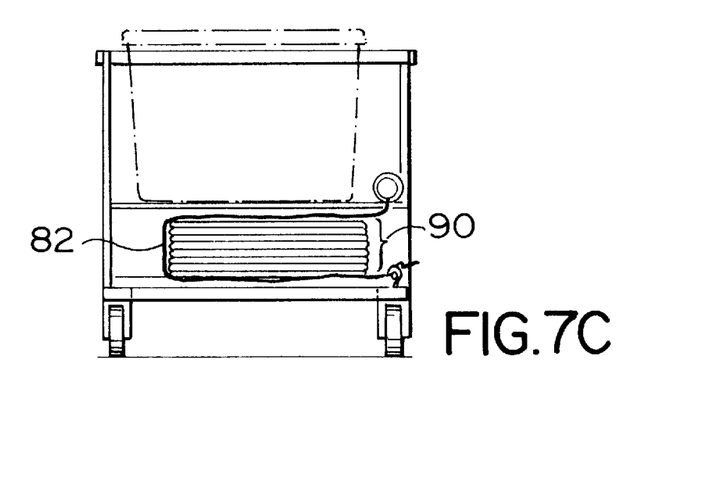
FIG. 7C is a left end view similar to FIG. 7B, but showing the lower compartment filled with the newspapers or pieces of cardboard.

FIGS. 6, 7A, 7B and 7C illustrate the use of the string dispenser mechanism described in the foregoing paragraph. As shown in FIG. 7A, a front edge of a newspaper 90 (or a piece of cardboard, as described later) being pushed into the lower compartment 30 contacts the string 82 and pulls a further length of the string 82 from the string dispenser 80. Once the newspaper 90 rests in the lower compartment 30 the string 82 extends both under and across the top of the newspaper 90. As further newspapers 90 are pushed into the lower compartment 30, further lengths of string are pulled from dispenser 80, as is shown in FIG. 7B. FIG. 7C illustrates a lower compartment 30 filled with newspapers 90. At that point a person detaches the string 82 from hook member 84 to form a first end, pulls a further length of string 82 from the dispenser 80, cuts the additional string 82 to form a second end, then ties the first and second ends together. The tied bundle of newspapers 90 may then be more easily pulled from the lower compartment 30 and also more neatly stacked on a pick-up vehicle. The new end of string 82 is then tied to the hook member 84, and the lower compartment 30 is ready to be refilled.

For loading one of the lower compartments 30 with cardboard pieces, a cutting means has been added to trolley 20. As shown in FIGS. 6 and 6A, it comprises a U-shaped gauge channel 92 which is mounted above the top side members 62; from each end of the channel 92 extends an arcuate pin 93. The pair of pins 93 may be fitted into one of two pairs of holes on the side members 62—one of the pairs of holes represents a storage position (the left position in FIG. 6A), and the other pair of holes represents an operative position (the right position in FIG. 6A). With a piece of cardboard 94 in the mouth of the gauge channel 92 in its operative position, a person pulls a hand-held knife 96 across the cardboard—with the knife blade sliding through a stainless steel U-shaped guide channel 97 attached to the side of the top end member 66, as shown in FIG. 1. The operative position of the gauge channel 92 is such that cardboard pieces cut by this arrangement fit uniformly within a respective lower compartment 30—which has a string dispenser mechanism for tying together the cardboard pieces in a manner identical to that used for tying together the newspapers 90.

FIG. 6B illustrates another embodiment, in which the U-shaped gauge channel 92 and the pair of arcuate pins 93 have been respectively replaced by a Z-bar member 92*a* and a pair of threaded arcuate pins 93*a*. The arrangement shown in FIG. 6B is less difficult to manufacture than the one shown in FIG. 6A. The pins 93*a* would fit into holes in the side members 62 in an identical manner to the pins 93.

As shown in FIG. 1, the recycler trolley sits on the wheels 48 and the leg struts 54, the steel mesh floor member 52 sitting approximately six inches off the ground. The wheels 48 are positioned slightly off-centre of the mid-points of the base side member 40, closer to the end of trolley 20 which does not have the leg struts 54. The central position of the wheels 48 allows a person to push the trolley using the handle 68 with reduced effort. When the handle 68 is not being lifted for moving the trolley, pointed members 56 dig into the ground to hold the trolley at a fixed position. This latter feature is particularly important for elderly users of the trolley, since it will prevent the trolley from rolling by itself if the elderly user should lose their balance and will also provide support to the person to prevent them from falling.

As indicated earlier, FIG. 1 illustrates a garbage container 34 and a recyclables bin 36 mounted on trolley 20. The trolley is built to accept either type of container. Modern plastic garbage bins have a shape that is generally frusto-conical. The standard size has a diameter of approximately 22 to 26 inches across the top, a diameter of approximately 18 to 20 inches across the bottom, and a height of approximately 30 inches. Recycling bins are generally rectangular, and come in several standard sizes. They typically have one of the following horizontal cross-sections (in inches): 12×16, 16×19, 24×24, and have a height of between 16 and 24 inches. The height of shelf 32 in trolley 20 would normally be set at about 8 inches above the steel mesh floor member 52, allowing a 16-inch-high recycling bin to be positioned in an upper compartment 28 without protruding significantly above the top of that compartment. A 24-inch-high recycling bin may be positioned in the centre compartment 26 in lieu of the illustrated garbage container 34.

Figure 8:
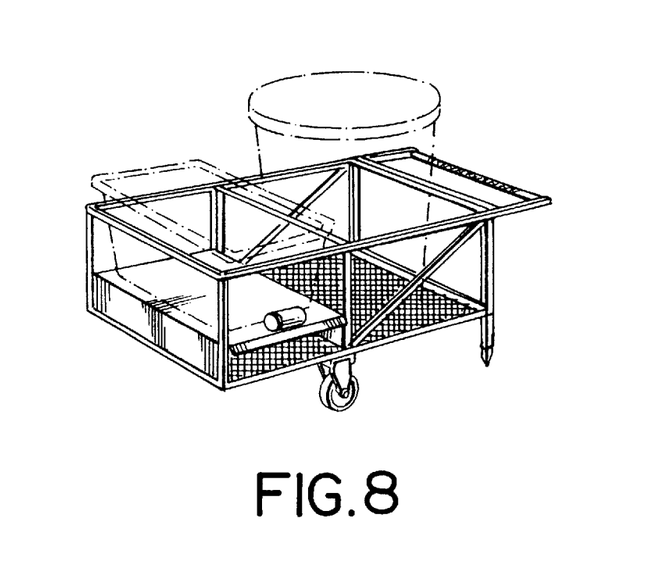
FIG. 8 is a perspective view of a second embodiment of the recycler trolley, the trolley having one first compartment and one second compartment; and, FIG. 9 is a perspective view of a third embodiment of the recycler trolley, the trolley having two first compartments and two second compartments.
Figure 9:
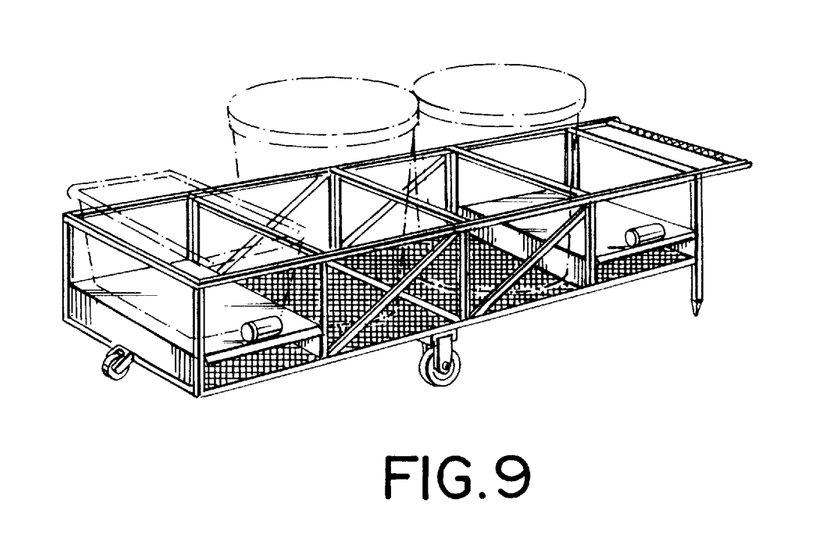

FIGS. 8 and 9 illustrate, respectively, a two-compartment recycler trolley and a four-compartment recycler trolley, both constructed in a similar way to the three-compartment trolley described above. The four-compartment trolley is constructed such that the two lower compartments for collecting newspapers and cardboard products are positioned on either side of the other two compartments.

I claim:

1. A recycler trolley, comprising:
   a base member supported for manual movement on a mobility means;
   an upper frame mounted on the base member, the upper frame defining at least one first compartment and at least one second compartment, each first compartment having the same height as each second compartment, each first compartment and each second compartment having a width approximating the width of the base member, the aggregate length of the at least one first compartment and the at least one second compartment approximating the length of the base member, each first compartment being divided into an upper compartment and a lower compartment by a respective shelf means; and,
   a string dispensing means for each first compartment, each dispensing means being mounted partially on the respective shelf means and partially on the base member such that string is initially extended vertically across an entrance of the lower compartment of the respective first compartment on one side of the trolley;
   wherein the trolley is adapted such that the placement of an initial flat object into a lower compartment through the respective entrance of that lower compartment causes a forward edge of that object to draw string out of the respective dispensing means, the string then extending across the top and under the bottom of the initial flat object, the placement of further flat objects into the lower compartment causing additional string to be drawn from the respective dispensing means such that the string extends across the top of the last flat object placed into the compartment while remaining under the bottom of the initial flat object, the string thereby extending around all flat objects in the lower compartment and allowing those objects to be bound into a single package for facilitating their removal from that compartment, wherein a portion of the upper frame is comprised of upper support members each extending across a top face of the trolley, respective upper support members extending from one side to the other side of the trolley at each end of the trolley and between pairs of adjacent compartments, and wherein a gauge member is removably mounted on the top of the trolley, the gauge member being used for aligning one end of one or more pieces of cardboard to facilitate cutting of the other end of the cardboard by a cutting means adapted to be extended within a cutting guide that is adjacent to a particular upper support member, the cardboard being so cut in order to uniformly fit within one of the lower compartments, and wherein the gauge member is a U-channel member which is mounted on the top of the trolley such that a mouth of the U-channel member faces toward the particular upper support member, wherein the one end of the one or more pieces of cardboard is adapted to fit into the mouth of the U-channel, and wherein the cutting guide is a U-shaped stainless steel member.

2. A recycler trolley as in claim 1, wherein the string dispensing means comprises:

a container for holding string, the container being mounted on the respective shelf means; and a string attachment member, the attachment member being mounted on the base member at a point below the respective shelf means.

3. A recycler trolley as in claim 1, wherein the mobility means comprises:

a pair of wheels, each positioned opposite to the other on a respective longer side of the base member, the pair of wheels being positioned on the base member generally centrally of the longer side but slightly closer to a first end of the trolley;

a pair of legs, each positioned at a respective one of a pair of corners of the base member at a second end of the trolley, the outer end of each of the legs being pointed for piercing a ground surface; wherein, for movement of the trolley, a person raises the second end of the trolley so that the outer end of each of the legs is above the surface, and then balances the trolley while moving it on the pair of wheels.

4. A recycler trolley as in claim 3, wherein the trolley has a handle member attached to the upper frame at the second end of the trolley.

5. A recycler trolley as in claim 1, wherein the base member comprises:

an outer frame;

a lower support member extending from one side to the other side of the trolley and supported at either end by a respective wheel of the pair of wheels; and, a mesh floor member having planar integrity, the mesh floor member being supported by the outer frame and the lower support member; wherein the mesh floor member allows water to drain therethrough.

6. A recycler trolley as in claim 1, wherein the ends of the trolley as well as that portion of the other side of the trolley that is behind each first compartment is enclosed, wherein a wall extends between each adjacent pair of compartments, and wherein each shelf means is a solid shelf member through which water cannot pass, the edge of each shelf member on the one side of the trolley extending at a sloping downward angle so as to channel water on an upper surface of the shelf member away from the entrance of the respective lower compartment.

7. A recycler trolley as in claim 1, wherein each of the flat objects is a newspaper.

8. A recycler trolley as in claim 1, wherein each of the flat objects is one or more pieces of cardboard.

9. A recycler trolley as in claim 1, wherein the particular upper support member is a support member extending across one of the ends of the trolley.

10. A recycler trolley as in claim 1, wherein each second compartment is adapted to receive one a recycling bin having one of a first group of standard sizes, and wherein each upper compartment is adapted to receive one a recycling bin having one of a second group of standard sizes, the depth of the bins of the second group of standard sizes being less than the depth of bins of the first group of standard sizes.

11. A recycler trolley as in claim 1, wherein the trolley has two first compartments and one second compartment, the second compartment being positioned intermediate of the two first compartments.

12. A recycler trolley as in claim 1, wherein the trolley has only one first compartment and one second compartment.

13. A recycler trolley as in claim 1, wherein the trolley has two first compartments and two second compartments, the two second compartments being positioned intermediate of the two first compartments.

14. A recycler trolley, comprising:

a base member supported for manual movement on a mobility means;

an upper frame mounted on the base member, the upper frame defining at least one first compartment and at least one second compartment, each first compartment having the same height as each second compartment, each first compartment and each second compartment having a width approximating the width of the base member, the aggregate length of the at least one first compartment and the at least one second compartment approximating the length of the base member, each first compartment being divided into an upper compartment and a lower compartment by a respective shelf means; and, a string dispensing means for each first compartment, each dispensing means being mounted partially on the respective shelf means and partially on the base member such that string is initially extended vertically across an entrance of the lower compartment of the respective first compartment on one side of the trolley;

wherein the trolley is adapted such that the placement of an initial flat object into a lower compartment through the respective entrance of that lower compartment causes a forward edge of that object to draw string out of the respective dispensing means, the string then extending across the top and under the bottom of the initial flat object, the placement of further flat objects into the lower compartment causing additional string to be drawn from the respective dispensing means such that the string extends across the top of the last flat object placed into the compartment while remaining under the bottom of the initial flat object, the string thereby extending around all flat objects in the lower compartment and allowing those objects to be bound into a single package for facilitating their removal from that compartment, wherein a portion of the upper frame is comprised of upper support members each extending across a top face of the trolley, respective upper support members extending from one side to the other side of the trolley at each end of the trolley and between pairs of adjacent compartments, and wherein a gauge member is removably mounted on the top of the trolley, the gauge member being used for aligning one end of one or more pieces of cardboard to facilitate cutting of the other end of the cardboard by a cutting means adapted to be extended within a cutting guide that is adjacent to a particular upper support member, the cardboard being so cut in order to uniformly fit within one of the lower compartments, and wherein the gauge member is a Z-bar member which is mounted on the top of the trolley such that a mouth defined by the top of the trolley and the Z-bar member faces toward the particular upper support member, wherein the one end of the one or more pieces of cardboard is adapted to fit into the mouth, and wherein the cutting guide is a U-shaped stainless steel member.

15. A recycler trolley as in claim 14, wherein the string dispensing means comprises:

a container for holding string, the container being mounted on the respective shelf means; and a string attachment member, the attachment member being mounted on the base member at a point below the respective shelf means.

* * * * *